United States Patent
Seiders, Jr.

(10) Patent No.: US 11,076,532 B2
(45) Date of Patent: Aug. 3, 2021

(54) METHOD AND SYSTEM FOR CONTROLLING THE HEIGHT OF AN AGRICULTURAL IMPLEMENT RELATIVE TO THE GROUND

(71) Applicant: CNH Industrial America LLC, New Holland, PA (US)

(72) Inventor: Kenneth E. Seiders, Jr., Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 280 days.

(21) Appl. No.: 16/134,588

(22) Filed: Sep. 18, 2018

(65) Prior Publication Data

US 2019/0082598 A1    Mar. 21, 2019

Related U.S. Application Data

(60) Provisional application No. 62/559,788, filed on Sep. 18, 2017.

(51) Int. Cl.
*A01D 41/14*   (2006.01)
*A01D 75/28*   (2006.01)
(Continued)

(52) U.S. Cl.
CPC .......... *A01D 41/141* (2013.01); *A01B 63/008* (2013.01); *A01B 63/111* (2013.01);
(Continued)

(58) Field of Classification Search
CPC .. A01D 41/141; A01D 75/287; A01B 63/114; A01B 63/1112; A01B 63/1115; A01B 63/111; A01B 63/008; A01B 63/10
See application file for complete search history.

(56) References Cited

U.S. PATENT DOCUMENTS 3,704,574 A * 12/1972 Gardner ............... A01D 41/141
                                                          56/10.2 E
4,437,295 A *  3/1984 Rock .................... A01D 41/141
                                                          56/10.2 E
(Continued)

FOREIGN PATENT DOCUMENTS

EP         2630856 A2    8/2013

OTHER PUBLICATIONS

Extended European Search Report for EP Application No. 18194306.9 dated Feb. 15, 2019 (7 pages).

*Primary Examiner* — Dale W Hilgendorf
(74) *Attorney, Agent, or Firm* — Peter Zacharias; Patrick Sheldrake

(57) ABSTRACT

In one aspect, a method is disclosed for automatically controlling a position of an implement of an agricultural work vehicle relative to a ground surface. The method may include monitoring, with one or more computing devices, an implement position parameter indicative of the position of the implement relative to the ground surface. The method may also include calculating a normal output signal based on the implement position parameter. The method may also include determining when a boost condition is satisfied based on a comparison between the implement position parameter and a predetermined implement position parameter threshold. The method may also include computing a boost output signal based on the implement position parameter. The method may also include adjusting the position of the implement relative to the ground surface based on the normal output signal and the boost output signal.

22 Claims, 5 Drawing Sheets

(51) Int. Cl.
*A01B 63/00* (2006.01)
*A01B 63/111* (2006.01)
*A01B 63/114* (2006.01)
*A01B 63/10* (2006.01)

(52) U.S. Cl.
CPC ......... *A01B 63/114* (2013.01); *A01B 63/1112* (2013.01); *A01B 63/1115* (2013.01); *A01D 75/287* (2013.01); *A01B 63/10* (2013.01)

(56) References Cited

U.S. PATENT DOCUMENTS

| | | | |
|---|---|---|---|
| 5,155,984 A * | 10/1992 | Sheehan | A01D 41/141 56/10.2 E |
| 5,524,424 A | 6/1996 | Halgrimson et al. | |
| 5,535,577 A * | 7/1996 | Chmielewski | A01D 41/141 56/10.2 E |
| 5,704,200 A * | 1/1998 | Chmielewski, Jr. et al. | A01D 41/141 56/10.2 E |
| 5,713,190 A * | 2/1998 | Vermeulen et al. | A01D 41/141 56/10.2 E |
| 5,937,621 A * | 8/1999 | Eggenhaus | A01D 41/141 56/10.2 E |
| 6,073,070 A * | 6/2000 | Dickhans | A01D 41/141 701/50 |
| 6,826,894 B2 * | 12/2004 | Thiemann | A01D 41/141 56/10.2 E |
| 8,843,283 B2 * | 9/2014 | Strelioff et al. | A01D 41/141 701/50 |
| 9,148,998 B2 * | 10/2015 | Bollin | A01D 41/141 |
| 10,182,525 B2 * | 1/2019 | Isaac et al. | A01D 75/287 |
| 10,455,765 B2 * | 10/2019 | Seiders, Jr. | A01D 41/141 |
| 10,531,607 B2 * | 1/2020 | Schroeder et al. | A01D 41/141 |
| 10,827,665 B2 * | 11/2020 | Sporrer et al. | A01B 63/1115 |
| 2008/0155953 A1 * | 7/2008 | Cleodolphi | A01D 41/141 56/10.2 E |
| 2010/0287900 A1 * | 11/2010 | Ringwald et al. | A01D 41/141 56/17.1 |
| 2015/0305239 A1 * | 10/2015 | Jung | A01D 41/141 701/50 |
| 2016/0153165 A1 * | 6/2016 | Singh | E02F 9/2029 701/50 |
| 2016/0316624 A1 * | 11/2016 | Ritter et al. | A01D 41/141 |
| 2017/0064904 A1 * | 3/2017 | Figgins et al. | A01D 41/141 |
| 2018/0255706 A1 * | 9/2018 | Smith et al. | A01D 41/141 |
| 2019/0059223 A1 * | 2/2019 | Seiders, Jr. | A01B 63/008 |
| 2020/0045884 A1 * | 2/2020 | Seiders, Jr. | A01D 41/141 |

\* cited by examiner

METHOD AND SYSTEM FOR CONTROLLING THE HEIGHT OF AN AGRICULTURAL IMPLEMENT RELATIVE TO THE GROUND

FIELD OF THE INVENTION

The present subject matter relates generally to height control systems for agricultural implements, and, more particularly, to a method and system for controlling the height of an agricultural implement relative to a ground surface.

BACKGROUND OF THE INVENTION

A harvester is an agricultural machine that is used to harvest and process crops. For instance, a forage harvester may be used to cut and comminute silage crops, such as grass and corn. Similarly, a combine harvester may be used to harvest grain crops, such as wheat, oats, rye, barely, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects the crop from the field and feeds it to the base harvester for further processing.

Conventionally, the operation of most harvesters requires substantial operational involvement and control by the operator. For example, with reference to a combine, the operator is typically required to control various operating parameters, such as the direction of the combine, the speed of the combine, the height of the combine header, the air flow through the combine cleaning fan, the amount of harvested crop stored on the combine, and/or the like. To address such issues, many current combines utilizes an automatic header height and tilt control system to maintain a constant cutting height above the ground regardless of the ground contour or ground position relative to the base combine. For instance, it is known to utilize electronically controlled height and tilt cylinders to automatically adjust the height and lateral orientation, or tilt, of the header relative to the ground based on sensor measurements. However, such systems often exhibit significant lag and slow response times, particularly when the harvester is operating at high ground speeds.

Accordingly, an improved method and related system for controlling the height of an agricultural implement relative to the ground that addresses one or more of the issues identified above would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for automatically controlling a position of an implement of an agricultural work vehicle relative to a ground surface. The method may comprise monitoring, with one or more computing devices, an implement position parameter indicative of the position of the implement relative to the ground surface. The method may also comprise calculating, with one or more computing devices, a normal output signal based on the implement position parameter. The method may also comprise determining, with the one or more computing devices, when a boost condition is satisfied based on a comparison between the implement position parameter and a predetermined implement position parameter threshold. The method may also comprise computing, with the one or more computing devices, a boost output signal based on the implement position parameter. The method may also comprise adjusting, with the one or more computing devices, the position of the implement relative to the ground surface based on the normal output signal and the boost output signal.

In another aspect, the present subject matter is directed to a position control system for an implement of an agricultural work vehicle. The position control system may comprise an implement connected with the agricultural work vehicle and an implement position sensor configured to detect a position of the implement relative to a ground surface. The position control system may comprise a controller communicatively coupled to the implement position sensor. The controller may include a processor and associated memory, and the memory may store instructions that, when executed by the processor, configure the implement controller to perform various steps. The controller may be configured to monitor an implement position parameter indicative of the position of the implement relative to the ground surface based on signals received from the implement position sensor. The controller may be configured to calculate a normal output signal based on the implement position parameter. The controller may be configured to determine when a boost condition is satisfied based on a comparison between the implement position parameter and a predetermined implement position parameter threshold. The controller may be configured to compute a boost output signal based on the implement position parameter and adjust the position of the implement relative to the ground surface based on the normal output signal and the boost output signal.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
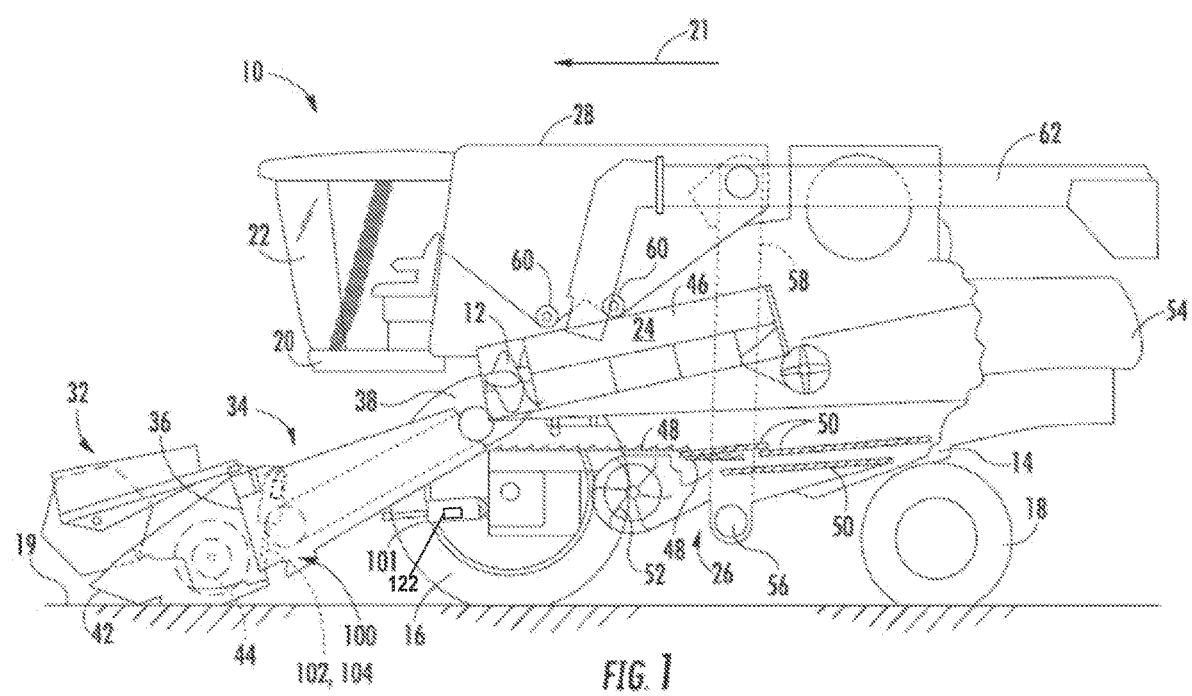
FIG. 1 illustrates a simplified, partial sectional side view of one embodiment of an agricultural vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a control system for controlling the height of an implement associated with an agricultural vehicle. For example, a proportional-integral ("PI") or proportional-integral-derivative ("PID") control system may monitor and control the height of the implement relative to a ground surface. The control system may be configured to monitor an implement position parameter indicative of the position of the implement relative to the ground and calculate a normal output signal based on the sum of at least one of a proportional, integral, or derivative signal associated with the implement position parameter. The controller may additionally be configured to determine when a boost condition associated with the implement position is satisfied and compute a boost output signal. The controller may then be configured to adjust the position of the implement relative to the ground surface based on the normal output signal and the boost output signal. The boost output signal may, for example, be configured to rapidly return the implement to within a desired position range as indicated by the implement position parameter compared with a predetermined implement position parameter threshold.

The method and control system disclosed herein may allow the parameters associated with the normal output signal to be selected, or tuned, such that the controller provides improved control during "normal" operation e.g., when the boost condition is not satisfied. For example, the parameters associated with the normal output signal may not need to be tuned for large disturbances, such as bumps or irregularities in the ground. Instead, the boost condition may detect such large disturbances and the resulting boost output signal may be used to quickly adjust the implement position relative to the ground to resume "normal" operation.

Referring now to the drawings, FIG. 1 illustrates a simplified, partial sectional side view of one embodiment of a work vehicle, a harvester 10. The harvester 10 may be configured as an axial-flow type combine, wherein crop material is threshed and separated while it is advanced by and along a longitudinally arranged rotor 12. The harvester 10 may include a chassis or main frame 14 having a pair of driven, ground-engaging front wheels 16 and a pair of steerable rear wheels 18. The wheels 16, 18 may be configured to support the harvester 10 relative to a ground surface 19 and move the harvester 10 in a forward direction of movement 21 relative to the ground surface 19. Additionally, an operator's platform 20 with an operator's cab 22, a threshing and separating assembly 24, a grain cleaning assembly 26 and a holding tank 28 supported by the frame 14. Additionally, as is generally understood, the harvester 10 may include an engine and a transmission mounted on the frame 14. The transmission may be operably coupled to the engine and may provide variably adjusted gear ratios for transferring engine power to the wheels 16, 18 via a drive axle assembly (or via axles if multiple drive axles are employed).

Moreover, as shown in FIG. 1, a harvesting implement (e.g., a header 32) and an associated feeder 34 may extend forward of the main frame 14 and may be pivotally secured thereto for generally vertical movement. In general, the feeder 34 may be configured to serve as support structure for the header 32. As shown in FIG. 1, the feeder 34 may extend between a front end 36 coupled to the header 32 and a rear end 38 positioned adjacent to the threshing and separating assembly 24. As is generally understood, the rear end 38 of the feeder 34 may be pivotally coupled to a portion of the harvester 10 to allow the front end 36 of the feeder 34 and, thus, the header 32 to be moved upwardly and downwardly relative to the ground surface 19 to set the desired harvesting or cutting height for the header 32.

As the harvester 10 is propelled forwardly over a field with standing crop, the crop material is severed from the stubble by a sickle bar 42 at the front of the header 32 and delivered by a header auger 44 to the front end 36 of the feeder 34, which supplies the cut crop to the threshing and separating assembly 24. As is generally understood, the threshing and separating assembly 24 may include a cylindrical chamber 46 in which the rotor 12 is rotated to thresh and separate the crop received therein. That is, the crop is rubbed and beaten between the rotor 12 and the inner surfaces of the chamber 46, whereby the grain, seed, or the like, is loosened and separated from the straw.

Crop material which has been separated by the threshing and separating assembly 24 falls onto a series of pans 48 and associated sieves 50, with the separated crop material being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that removes chaff and other impurities from the crop material. For instance, the fan 52 may blow the impurities off of the crop material for discharge from the harvester 10 through the outlet of a straw hood 54 positioned at the back end of the harvester 10.

The cleaned crop material passing through the sieves 50 may then fall into a trough of an auger 56, which may be configured to transfer the crop material to an elevator 58 for delivery to the associated holding tank 28. Additionally, a pair of tank augers 60 at the bottom of the holding tank 28 may be used to urge the cleaned crop material sideways to an unloading tube 62 for discharge from the harvester 10.

Moreover, in several embodiments, the harvester 10 may also include a hydraulic system 100 which is configured to adjust a height of the header 32 relative to the ground surface 19 so as to maintain the desired cutting height between the header 32 and the ground surface 19. The hydraulic system 100 may include a height control cylinder 101 configured to adjust the height of the header 32 relative to the ground. For example, in some embodiments, the height control cylinder 101 may be coupled between the feeder 34 and the frame 14 such that the second height control cylinder 101 may pivot the feeder 34 to raise the header 32 relative to the ground surface 19. In some embodiments, hydraulic system 100 may include first and second tilt cylinders 102, 104 coupled between the header 32 and the feeder 34 to allow the header 32 to be tilted relative to the ground surface 19 or pivoted laterally or side-to-side relative to the feeder 34.

Figure 2:
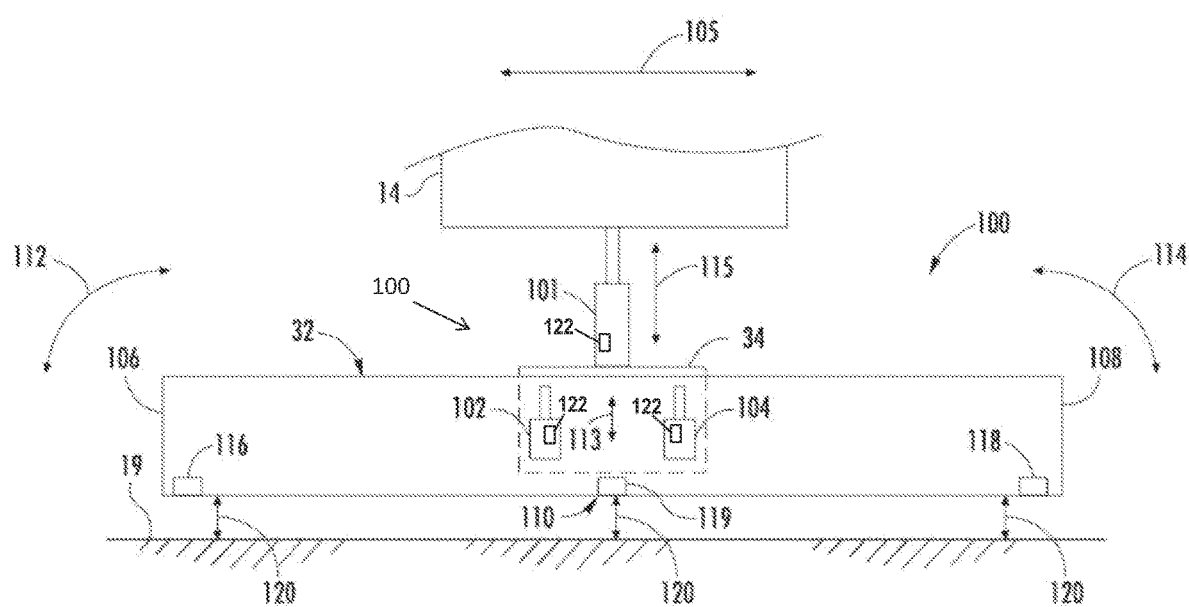
FIG. 2 illustrates a simplified, schematic view of one embodiment of a hydraulic system for an agricultural harvester in accordance with aspects of the present subject matter.

Referring now to FIG. 2, a simplified, schematic view of one embodiment of the hydraulic system 100 described above with reference to FIG. 1 is illustrated in accordance with aspects of the present subject matter. As shown, the header 32 may generally extend side-to-side or in a lengthwise direction (indicated by arrow 105 in FIG. 2) between a first lateral end 106 and a second lateral end 108. Additionally, the header 32 may be coupled to the feeder 34 at a location between its first and second lateral ends 106, 108 to allow the header 32 to tilt laterally relative to the feeder 34 (e.g., as indicated by arrows 112, 114 in FIG. 2). For example the header 32 may be coupled to the feeder 34 roughly at a center 110 of the header 32. The height control cylinder 101 may be configured to raise and lower the end of the feeder 34 relative to the frame 14 of the harvester (e.g., as indicated by arrow 115). The lateral tilt cylinders 102, 104 may be configured to laterally tilt the header 32 relative to the ground surface 19 (e.g., as indicated by arrows 112, 114). In some embodiments, the tilt cylinders may 102, 104 may also be configured to raise and lower the header 32 with respect to the feeder 34 (e.g., as indicated by arrow 113).

As indicated above, the hydraulic system 100 may include the height control cylinder 101 and one or more tilt cylinders 102, 104. For instance, as shown in the illustrated embodiment, the first tilt cylinder 102 may be coupled between the header 32 and the feeder 34 along one lateral side of the connection between the header 32 and the feeder 34, and a second tilt cylinder 104 may be coupled between the header 32 and the feeder 34 along the opposed lateral side of the connection between the header 32 and the feeder 34. In general, the operation of the height control cylinder 101 and tilt cylinders 102, 104 may be controlled (e.g., via an associated controller) to adjust the height and angle of the header 32 relative to the ground surface 19. For instance, one or more height sensors 116, 118, 119 may be provided on the header 32 to monitor one or more respective local distances or heights 120 defined between the header 32 and the ground surface 19. Specifically, as shown in FIG. 2, a first height sensor 116 may be provided at or adjacent to the first lateral end 106 of the header 32, and a second height sensor 118 may be provided at or adjacent to the second lateral end 108 of the header 32. In some embodiments, a third height sensor 119 may be provided at or adjacent the center 110 of the header 32. In such an embodiment, when one of the height sensors 116, 118, 119 detects that the local height 120 defined between the header 32 and the ground surface 19 differs from a desired height (or falls outside a desired height range), the height control cylinder 101 and/or the tilt cylinders 102, 104 may be actively controlled so as to adjust the height and/or tilt of the header 32 in a manner that maintains an overall height of the header 32 at the desired height (or within the desired height range) relative to the ground surface 19. In some embodiments, the overall height may be an average, weighted average, or other suitable mathematical combination of the local heights 120 measured by one or more of the height sensors 116, 118, 119. In some embodiments, the overall height may be the local height 20 measured at the height sensor 119 that is adjacent the center or middle of the implement 32. In some embodiments, the hydraulic system 100 may also include at least one pressure sensor 122 configured to measure an actuator pressure associated with at least one of the height control cylinder 101, the first tilt cylinder 102, or the second tilt control cylinder 104.

Figure 3:
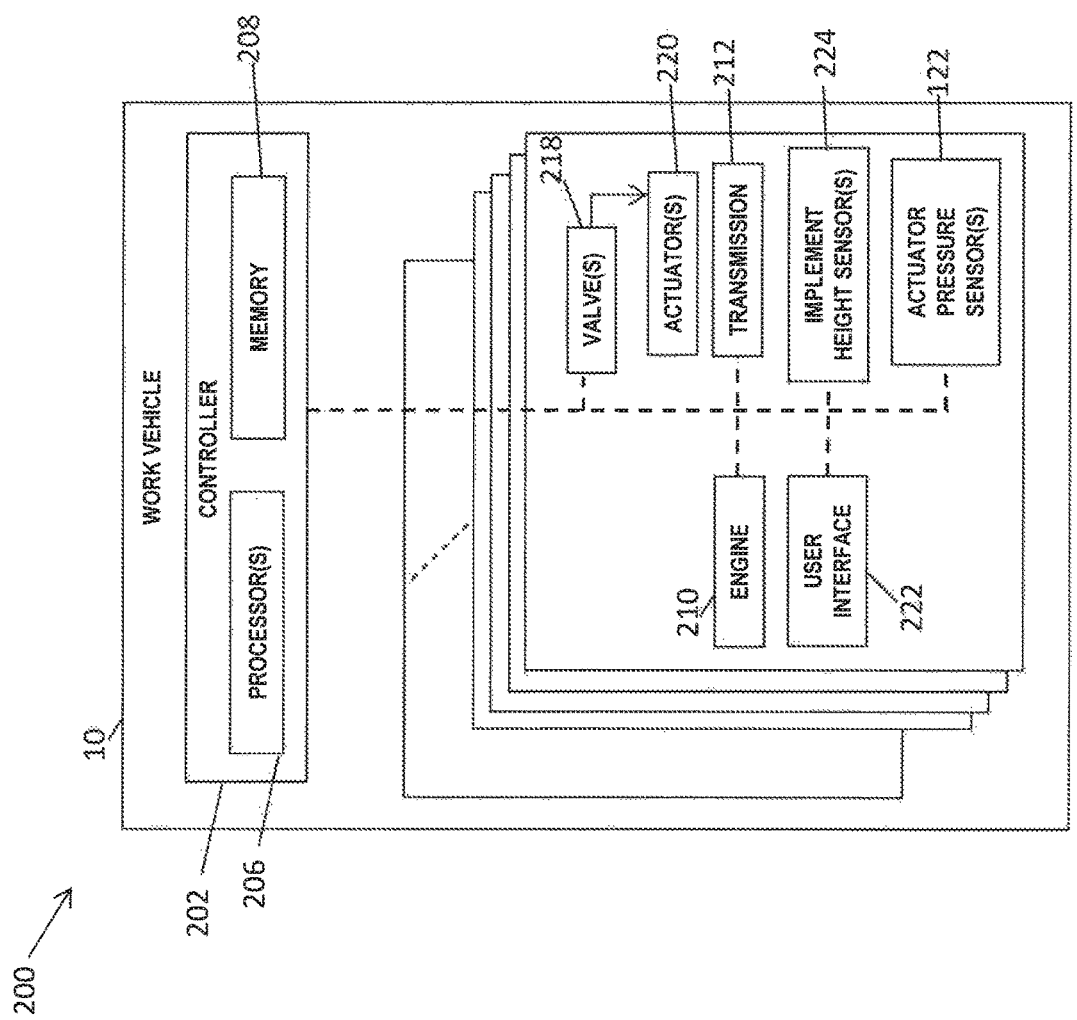
FIG. 3 illustrates a schematic view of one embodiment of a system for controlling the height of an agricultural implement relative to the ground in accordance with aspects of the present subject matter.

Referring now to FIG. 3, a schematic view of one embodiment of a control system 200 is provided for automatically controlling the height of an agricultural implement (such as the header 32 of the harvester 10 described above) relative to the ground surface 19 in accordance with aspects of the present subject matter. In general, the control system 200 will be described herein with reference to the harvester 10 and header 32 illustrated in FIG. 1. However, it should be appreciated that the disclosed control system 200 may be implemented to control the height of any suitable agricultural implement associated with a work vehicle having any other suitable configuration.

As shown, the control system 200 may generally include a controller 202 installed on and/or otherwise provided in operative association with the harvester 10. In general, the controller 202 of the disclosed system 200 may correspond to any suitable processor-based device(s), such as a computing device or any combination of computing devices. Thus, in several embodiments, the controller 202 may include one or more processor(s) 206 and associated memory device(s) 208 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 of the controller 202 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206 configure the controller 202 to perform various computer-implemented functions, such as one or more aspects of a method 300 for controlling the height of the implement described below with reference to FIG. 4.

In addition, the controller 202 may also include various other suitable components, such as a communications circuit or module, a network interface, one or more input/output channels, a data/control bus and/or the like, to allow the controller 202 to be communicatively coupled with any of the various other system components described herein. In some embodiments, the controller 202 may be configured to monitor and/or control the engine 210 and transmission 212 of the harvester 10.

Referring still to FIG. 3, the controller 202 may generally be configured to control the operation of one or more components of the harvester 10. For instance, in several embodiments, the controller 202 may be configured to control the operation of one or more components that regulate the height of the header 32 relative to the ground surface 19, as indicated above. For example, the controller 202 may be communicatively coupled to one or more control valve(s) 218 configured to regulate the supply of fluid (e.g., hydraulic fluid or air) to one or more corresponding actuator(s) 220. In some embodiments, the actuators 220 may correspond to the height control cylinder 101, first tilt cylinder 102, and/or second tilt cylinder 104, and the control valve(s) 218 may correspond to one or more valves associated with the cylinder(s) 101, 102, 104.

Moreover, as shown in the illustrated embodiment, the vehicle controller 202 may be communicatively coupled to a user interface 222 of the work vehicle 10. In general, the user interface 222 may correspond to any suitable input device(s) configured to allow the operator to provide operator inputs to the vehicle controller 202, such as a touch screen display, a keyboard, joystick, buttons, knobs, switches, and/or combinations thereof located within the cab 22 of the work vehicle 10. The operator may provide various inputs into the system 200 via the user interface 222. In one embodiment, suitable operator inputs may include, but are not limited to a target height for the implement, a crop type and/or characteristic indicative of a suitable target header height, and/or any other parameter associated with controlling the height of the implement, as explained in greater detail below.

Additionally, controller 202 may also be communicatively coupled to the various sensors associated the header 32. For instance, as shown in FIG. 3, the controller 202 may be coupled to one or more implement height sensors 224 configured to monitor the height of the header 32 relative to the ground surface 19. In one embodiment, the implement height sensor(s) 224 may correspond to one or more of the one or more height sensors 116, 118, 119 configured to monitor local distance(s) or height(s) 120 defined between the header 32 and the ground surface 19. The controller 202 may also be communicatively coupled with at least one of actuator pressure sensor 122. Each actuator pressure sensor 122 may be configured to monitor an actuator pressure associated with one of the actuator(s) 220 configured to raise and lower the header 32 relative to the ground surface 19. As indicated above, in some embodiments, the actuator(s) 220 may correspond to the height control cylinder 101, first tilt cylinder 102, and/or second tilt cylinder 104, and the control valve(s) 218 may correspond to one or more valves associated with the cylinder(s) 101, 102, 104. For example, the actuator pressure sensor(s) 122 may correspond to at least one of the pressure sensors 122 described above with reference to FIG. 2.

Figure 4:
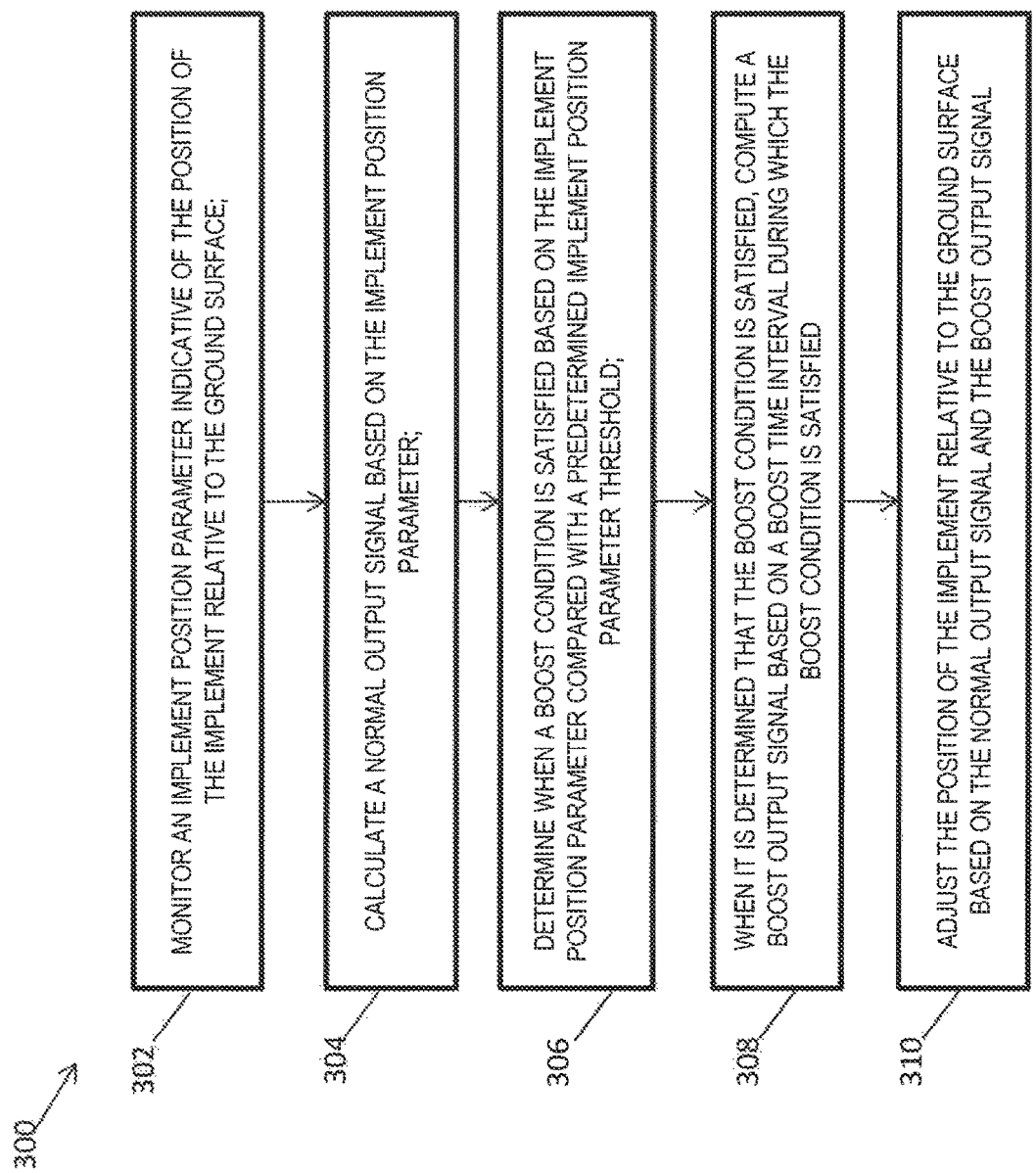
FIG. 4 illustrates a flow diagram showing one embodiment of a method for controlling the height of an agricultural implement relative to the ground in accordance with aspects of the present subject matter.

FIG. 4 illustrates a flow diagram of one embodiment of a method 300 for automatically controlling a position of an implement of an agricultural work vehicle relative to a ground surface in accordance with aspects of the present subject matter. Although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. Moreover, the method 300 will generally be described herein with reference to the harvester 10 and implement 32 shown in FIG. 1. However, it should be appreciated that the disclosed method 300 may be implemented to control the height of any suitable agricultural implement associated with a work vehicle having any other suitable configuration.

Referring to FIG. 4, the method 300 may include, at (302), monitoring an implement position parameter indicative of the position of the implement relative to the ground surface. In some embodiments, the implement position parameter may be indicative of an actuator pressure associated with an actuator 220 configured to raise and lower the implement 32 relative to the ground surface 19. For instance, implement position parameter may be indicative of an actuator pressure associated with at least one of the height control cylinder 101, first tilt control cylinder 102, or second tilt control cylinder 104. In other embodiments, the implement position parameter may be indicative of an implement height relative to the ground surface 19. For example, the implement position parameter may be indicative of at least one local height 120 of the implement 32. In other embodiments, the implement position parameter may be any suitable parameter associated with the position of the implement 32 relative to the ground surface 19.

In some embodiments, the controller 202 may be configured to monitor multiple implement position parameters. For example, the controller 202 may be configured to monitor at least one actuator pressure using an actuator pressure sensor 122 associated with at least one actuator 220 configured to raise and lower the implement 32 and, additionally, at least one local height 120 measured by one or more of the height sensors 116, 118, 119. In some embodiments, the controller 202 may monitor two or more of the local heights 120 measured by the height sensors 116, 118, 119.

The method 300 may include, at (304), calculating a normal output signal based on the implement position parameter. For example, in some embodiments, the controller 202 may calculate the normal output signal based on an implement height error. The controller 202 may determine the implement height error by comparing the height of the implement with a predetermined target height. For example, the controller 202 may subtract the predetermined target height from the monitored height to determine the implement height error. Thus, when the monitored height exceeds the predetermined target height, the implement height error may be positive, and when the predetermined target height exceeds the monitored height, the implement height error may be negative.

In some embodiments, the predetermined target height may be based on the specific model of the header 32 and/or may be input by the operator through the user interface 222. For example, as indicated above, the operator may directly input a desired target height or may input crop information or characteristics, such as the type, condition, height, density, and/or the like of the crop, from which the controller may select an appropriate target height using the user interface 222.

Calculating the normal output signal, at (304), may include calculating at least one of a proportional signal, integral signal, and derivative signal based on the implement height error. For example, in one embodiment, calculating the normal output signal may include calculating an integral signal based on the implement position parameter with respect to time. In some embodiments, the normal output signal may be the sum of one of more components, such as a proportional signal component, integral signal component, and/or derivative signal component. For instance, in one embodiment, the controller 202 may be configured to calculate the normal output signal in the same manner as a proportional-integral-derivative (PID) controller. The following equation shows the normal output signal, n(t), of a PID controller in accordance with aspects of the present disclosure, where e(t) represents the implement height error as a function of time, t; $K_p$, $K_i$, and $K_d$ represent respective constant gains for each of the proportional, integral, and derivative signal components:

$$n(t) = K_p e(t) + K_i \int e(t)dt + K_d \frac{de}{dt} \qquad (1)$$

In some embodiments, the normal output signal, n(t), may have only one of the above signal components e.g., direct, proportional, or integral. In other embodiments, any suitable combination of the signal components may be used, for instance as a proportional-integral (PI) controller or a proportional-derivative controller.

Referring again to FIG. 4, the method 300 may include, at (306), determining when a boost condition is satisfied based on a comparison between the implement position parameter and a predetermined implement position parameter threshold. In some embodiments, the boost condition may be satisfied when the implement height relative to the ground surface 19 exceeds a predetermined maximum height threshold. In some embodiments, the boost condition may be satisfied when the implement 32 contacts the ground surface 19. The controller 202 may detect this contact, for example, by determining when the implement height has fallen below a predetermined minimum height threshold and/or the actuator pressure associated with one or more of the actuator(s) 220 configured to raise and lower the implement 32 has fallen below a predetermined actuator pressure threshold. These and additional boost conditions will be explained in greater detail below with reference to FIG. 5.

Referring again to FIG. 4, the method 300 may include, at (308), computing a boost output signal when it is determined that the boost condition is satisfied. The boost output signal may be computed based on a boost time interval. The boost time interval may be defined as the time interval during which the boost condition is met. For example, in some embodiments, when the implement 32 contacts the ground surface 19, the controller 202 may be configured to compute a boost signal associated with a "raise" boost. The "raise" boost signal may be configured to rapidly increase the height of the implement 32 relative to the ground surface. For instance, in one embodiment, computing the boost output signal based on the boost time interval may include calculating an integral signal based on the implement position parameter with respect to the boost time interval. In some embodiments, the controller 202 may be configured to multiply a boost gain with the integrated implement position parameter to compute the boost output signal. In some embodiments, the controller 202 may be configured to "ramp", or increase, the boost output signal from zero to a calculated value, as described above, when the boost condition is satisfied. Once the boost condition is no longer satisfied, the controller 202 may be configured to "ramp", or reduce, the boost output signal back to zero, as explained in greater detail below. Additionally, in other embodiments, various other boost signals may be computed based on other boost conditions being satisfied, as explained in greater detail below.

Referring again to FIG. 4, the method 300 may include, at (310), adjusting the position of the implement 32 relative to the ground surface 19 based on the normal output signal and the boost output signal(s). Specifically, the controller 202 may be configured to adjust one or more of the control valve(s) 218 to raise and lower the header 32 relative to the ground surface 19 using one or more of the actuator(s) 220, such as the height control cylinder 101 and/or the tilt cylinders 102, 104. For example, in some embodiments, the controller 202 may be configured to sum the normal output signal, e.g., as calculated in Equation (1), with the boost output signal(s), e.g., as described above. For example, in one embodiment, the total output signal, u(t), may equal the sum of the proportional signal, integral signal, derivative signal, and the boost output signal. For instance, in some embodiments, the total output signal, u(t), may be calculated according to the following equation in which e(t) is the implement height error as a function of time, t; $K_p$, $K_i$, and $K_d$ are respective constant gains for each of the proportional, integral, and derivative signal components; and $S_{BOOST}$ is the boost output signal.

$$u(t) = K_p e(t) + K_i \int e(t)dt + K_d \frac{de}{dt} + s_{BOOST} \qquad (2)$$

As explained in greater detail below, the boost signal may generally be zero when the boost condition is not satisfied. Thus, the boost condition and boost output signal may allow for the control parameters associated with the normal output signal to be better optimized for normal operation. For instance, the respective constant gains $K_p$, $K_i$, and $K_d$ for each of the proportional, integral, and derivative signal components, may be selected, or tuned, to optimize the responsiveness of the control system 200 during "normal" operation, e.g., when the implement position parameter has not satisfied a boost condition.

Figure 5:
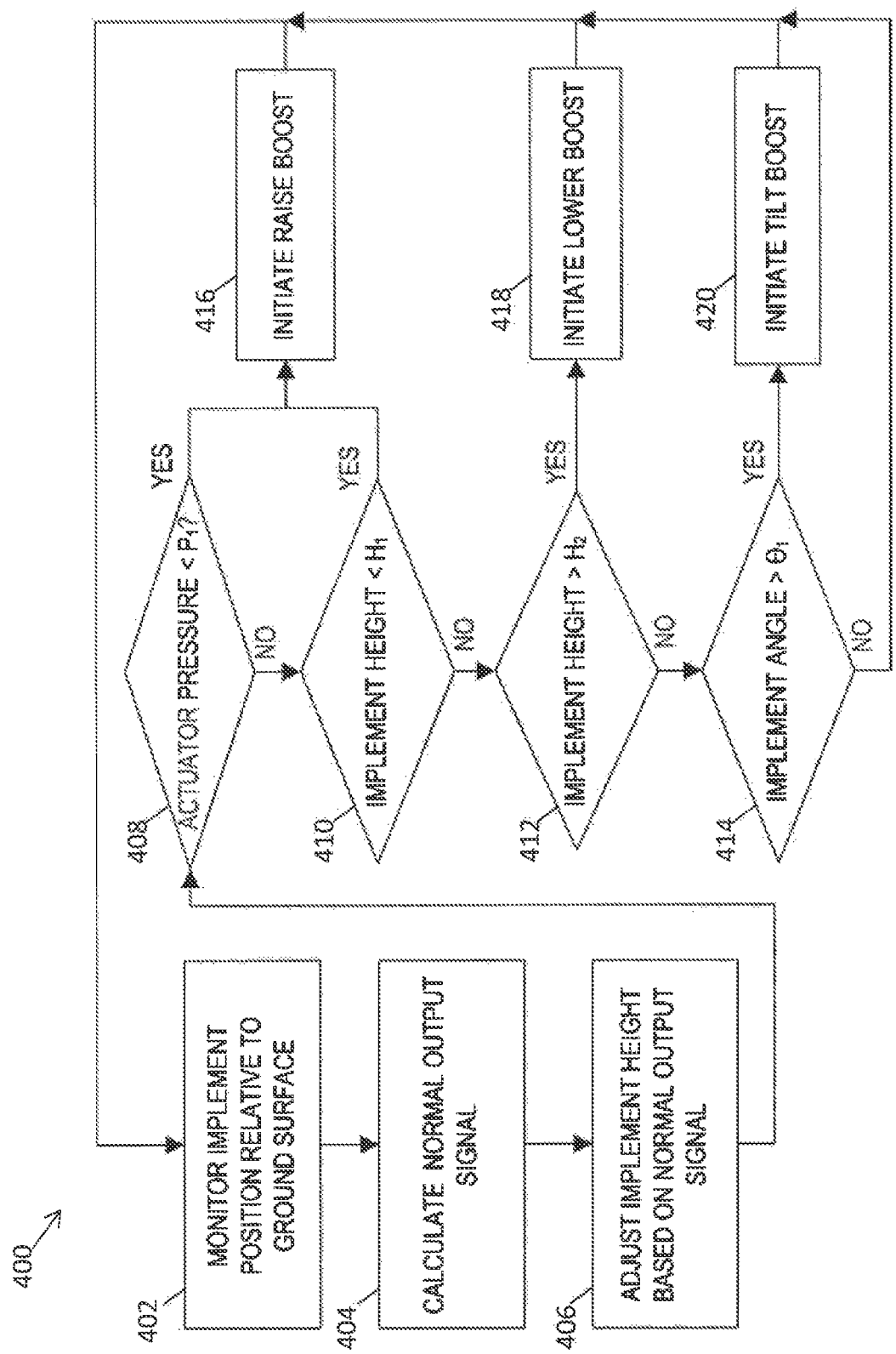
FIG. 5 illustrates a flow diagram of an algorithm representing a specific implementation of the method shown in FIG. 4 in accordance with aspects of the present subject matter.

FIG. 5 illustrates a flow diagram of a control algorithm 400 providing a specific embodiment or implementation of the method 300 illustrated in FIG. 4. Although FIG. 5 depicts steps performed in a particular order for purposes of illustration and discussion, the methods and algorithms discussed herein are not limited to any particular order or arrangement. One skilled in the art, using the disclosures provided herein, will appreciate that various steps of the methods and algorithms disclosed herein can be omitted, rearranged, combined, and/or adapted in various ways without deviating from the scope of the present disclosure. Moreover, the algorithm 400 will generally be described herein with reference to the harvester 10 and implement 32 shown in FIGS. 1 and 2, and also with reference to the control system 200 shown in FIG. 3. However, it should be appreciated that the disclosed algorithm 400 may be implemented using any suitable control system to control the height of any suitable agricultural implement associated with a work vehicle having any other suitable configuration.

Referring to FIG. 5, in some embodiments, various boost conditions may be associated with initiating various boost operations. At (402), the controller 202 may monitor the implement position parameter relative to the ground surface 19. In some embodiments, this step may be substantially similar to step (302) discussed above with reference to FIG. 4. As indicated above, in some embodiments, monitoring the implement position parameter may include monitoring at least one actuator pressure associated with at least one of the height control cylinder 101, first tilt control cylinder 102, or second tilt control cylinder 104 using at least one actuator pressure sensor 122. In other embodiments, the implement position parameter may be any suitable parameter associated with the position of the implement 32 relative to the ground surface 19. In some embodiments, monitoring the implement position parameter may include monitoring at least one local height 120 of the implement 32 relative to the ground surface 19 using at least one of the height sensors 116, 118, 119. In other embodiments, the controller 202 may be configured to monitor multiple implement position parameters, including at least one actuator pressure and at least one local height 120.

At (404), the controller 202 may be configured to calculate the normal output signal based on the implement position parameter. In some embodiments, this step may be substantially similar to step (304) discussed above with reference to FIG. 4. As indicated above, in some embodiments, the controller 202 may calculate the normal output signal based on an implement height error using, for example, Equation (1) representing the normal output signal of a PID controller.

At (406), the controller 202 may be configured to adjust the height of the implement 32 based on the normal output signal. For example, the controller may adjust the height of the implement 32 based on the output of Equation (1) above. In some embodiments, the controller 202 may be configured to continue adjusting the height of the implement 32 based on the normal output signal during the remainder of the algorithm 400 described below.

At (408), (410), (412), and (414), the controller 202 may be configured to determine when various boost conditions are satisfied based on various implement position parameters compared with respective predetermined implement position parameter thresholds. For example, at (408) and (410), the controller 202 may be configured to determine if an implement position parameter satisfies one of the "raise" boost conditions associated with initiating a "raise" boost operation. The "raise" boost conditions may generally be associated with detecting that the implement height relative to the ground surface 19 is too low, such as when the implement 32 contacts the ground surface 19.

At (408), the controller 202 may determine if an actuator pressure associated with an actuator 220 that is configured to raise and lower the implement 32 is less than a predetermined actuator pressure threshold (represented by "$P_1$" in FIG. 5). In some embodiments, this may indicate that the implement 32 has contacted the ground surface 19. Contacting the ground surface 19 may reduce the pressure in at least one of the actuators 220 configured to raise and lower the implement 32 because the ground surface 19 may temporarily support a portion of the weight of the implement 32. For instance, contacting the ground surface 19 may reduce the pressure in the height control cylinder 101 as the ground surface 19 temporarily supports a portion of the weight of the implement 32.

If the actuator pressure is not less than the predetermined actuator pressure threshold, at (410), the controller 202 may be configured to determine if the implement height is less than a predetermined height minimum threshold (represented by "$H_1$" in FIG. 5). In some embodiments, the implement height may be calculated as an average of the local heights 120 of the implement 32. The predetermined height minimum threshold may be selected such that when the implement 32 is less than the predetermined height minimum threshold, it is indicative of contact or imminent contact between the implement 32 and the ground surface 19. In some embodiments, the operator may input the predetermined height minimum threshold using the user interface 222.

If either boost condition explained above with reference to (408) or (410) is satisfied, the controller 202 may, at (416), initiate a "raise" boost operation at (416). The raise boost operation may be configured to quickly raise the implement 32 such that the implement position parameter is no longer less than the predetermined implement parameter position threshold. For example, the controller 202 may compute a boost output signal based on the boost time interval during which the boost condition is met. For example, in some embodiments, computing the boost output signal may include calculating an integral signal based on the implement position parameter with respect to time. Additionally, the boost output signal may include an associated "raise" boost gain. For example, in one embodiment, the "raise" boost signal, $S_{BOOST}$, may be calculated according to the following equation, in which e(t) is the implement height error, and $K_R$ is a constant raise boost gain.

$$S_{BOOST}=K_R\int e(t)dt \quad (3)$$

In another embodiment, the "raise" boost signal, $S_{BOOST}$, may instead be based on an integral of the difference between the implement height and the predetermined height minimum threshold with respect to time. For example, in one embodiment, the "raise" boost signal, $S_{BOOST}$, may be calculated according to the following equation, in which H(t) is the implement height, $H_1$ is the predetermined height minimum threshold, and $K_R$ is a constant "raise" boost gain value.

$$S_{BOOST}=K_R\int(H(t)-H_1)dt \quad (4)$$

In other embodiments, the "raise" boost signal, $S_{BOOST}$, may be computed as an integral signal based on the actuator pressure. For example, in one embodiment, the "raise" boost signal may be calculated according to the following equation, in which P is the actuator pressure and $K_R$ is a constant raise boost gain.

$$S_{BOOST}=K_R\int Pdt \quad (5)$$

In another embodiment, the boost output signal may be calculated as the integral of the difference between the actuator pressure and the predetermined actuator pressure threshold with respect to time. For instance, the "raise" boost signal, $S_{BOOST}$, may be calculated according to the following equation, in which P(t) is the actuator pressure, $P_1$ is the predetermined actuator pressure threshold, and $K_R$ is a constant raise boost gain value.

$$S_{BOOST}=K_R\int(P(t)-dt \quad (6)$$

The constant raise boost gain may be selected to optimize the response of the control system 200 when the "raise" boost condition is satisfied. For example, the constant raise boost gain may be based on the maximum desired speed of the implement 32, the weight of the implement 32, the capabilities of the height control cylinder 101, and/or the like. In some embodiments, the operator may adjust the constant raise boost gain using the user interface 222.

Initiating a "raise" boost, at (416), may include adjusting the position of the implement 32 relative to the ground surface 19 based on the normal output signal and the boost output signal. As indicated above, in some embodiments the controller 202 may be configured to adjust the position of the implement based on the sum of the normal output signal and the boost output signal, for example according to the Equation (2).

Additionally, the "raise" boost operation may include applying a ramp function to the calculated boost signal explained above. For example, once the controller 202 detects that at least one of the "raise" boost conditions is met, at (408) or (410), the controller 202 may ramp the boost output signal from zero to the calculated boost signal, explained above, over a first predetermined ramp time. Once the boost condition is no longer satisfied, the controller 202 may be configured to similarly decrease the boost output signal from the calculated boost signal to zero over a second predetermined ramp time, which may be equal to or different than the first predetermined ramp time. The ramp times may generally be selected based on the dynamics of the control system 200 or may be input or modified by the operator using the user interface 222. The dynamics of the control system 200 may include, for example, the weight of the implement 32 and the maximum speed at which the actuator(s) 220 may raise and lower the implement 32. In some embodiments, the control system 200 may be configured to monitor the current speed of the harvester 10, and the ramp times may vary according to how fast the harvester 10 is moving the implement 32 over the ground surface 19.

At (412), the controller 202 may generally be configured to determine if a "lower" boost condition is satisfied associated with initiating a "lower" boost operation. For example, at (412), the controller 202 may be configured to determine if the implement height exceeds a predetermined height maximum threshold relative to the ground surface (represented by "$H_2$" in FIG. 5). The predetermined height maximum threshold may be selected, for example, based on the operating range of the implement 32 during "normal" operation. For example, in some embodiments, the predetermined height maximum threshold may be some percentage of the target implement height, such as 130%, for example. In some embodiments, the operator may input or modify the predetermined height maximum threshold using the user interface 222.

If the "lower" boost condition is satisfied at (412), the controller 202 may initiate a "lower" boost operation at (418). The "lower" boost operation may be configured to quickly lower the implement 32 relative to the ground surface 19 such that the implement position parameter no longer exceeds the predetermined implement parameter position threshold. In some embodiments, the "lower" boost operation may otherwise be similar to the "raise" boost configuration described above at (416). For example, the "lower" boost operation may include computing a boost output signal based on the boost time interval during which the boost condition is met. In some embodiments, computing the boost output signal may include calculating an integral signal based on the implement position parameter (e.g., the implement height) with respect to time. For example, the "lower" boost signal may be based on an integral of the implement height or implement height error with respect to time. For instance, in one embodiment, the "lower" boost signal, $S_{BOOST}$, may be calculated according to the following equation, in which H(t) is the implement height and $K_L$ is a constant "lower" boost gain value.

$$S_{BOOST}=K_L \int H(t)dt \quad (7)$$

The constant lower boost gain may be selected based on similar considerations as the raise boost gain explained above. The lower boost gain may also be input and/or modified by the operator using the user interface 222.

In one embodiment, the "lower" boost output signal may be calculated as the integral of the difference between the implement height and the predetermined height maximum threshold relative to the ground surface. For example, in one embodiment, the "lower" boost signal, $S_{BOOST}$, may be calculated according to the following equation, in which H(t) is the implement height; $H_2$ is the predetermined height maximum threshold; and $K_L$ is a constant lower boost gain.

$$S_{BOOST} K_L \int (H_2-H(t))dt \quad (8)$$

The controller 202 may be configured to apply a ramp function to the "lower" boost output signal in a similar manner as explained above for the "raise" boost signal such that the "lower" boost output signal increases from zero to the calculated signals described above over a first predetermined time ramp. Once the boost condition is no longer satisfied, the controller 202 may be configured to similarly decrease the "lower" boost output signal from the calculated boost signal, explained above, to zero over a second predetermined ramp time. The first and second predetermined ramp times associated with the "lower" boost signal may be similarly selected based on the dynamics of the control system 200 and may be the same as or different than the ramp times associated with the "raise" boost signal.

At (414), the controller 202 may generally be configured to determine if a "tilt" boost condition is satisfied that is associated with initiating a "tilt" boost operation. For example, in some embodiments, the controller 202 may be configured to determine when an angle of the implement 32 relative to the ground surface 19 exceeds a predetermined maximum angle range. For example, in some embodiments, the controller 202 may be configured to determine if the local height 120 at one end of the implement 32 exceeds a predetermined height threshold while the local height 120 at the other end of the implement 32 remains below the predetermined height threshold. For example, referring back to FIG. 2, the controller 202 may be configured to determine if the local height 120 measured by one of the height sensors 116, 118, that is adjacent one of the respective ends 106, 108 of the header 32 exceeds the predetermined height threshold while the local height 120 measured by the other of the height sensors 116, 118 at the other the respective end 106, 108 does not exceed the predetermined height threshold.

In other embodiments, the controller 202 may be configured to calculate the angle of the implement 32 relative to the ground surface 19 based on the local heights 120 measured by two or more of the height sensors 116, 118, 119. In yet other embodiments, the controller 202 may be configured to directly measure the angle of the implement 32 using a sensor, such as an inclinometer, associated with the implement 32. To account for ground surfaces 19 that are not level, in some embodiments, the controller 202 may be further configured to monitor the angle between the main frame 14 of the harvester 10 and the ground surface 19 using an inclinometer associated with the main frame 14 of the harvester 10. For instance, the controller 202 may assume that the inclination of the frame 14 of the harvester 10 is approximately equal to the inclination of the ground surface 19. The controller 202 may then calculate the difference between the inclination of the harvester 10 and the inclination of the implement 32 to determine the relative angle between the implement 32 and the ground surface 19. Any suitable method, however, may be used to determine if the angle of the implement 32 relative to the ground surface 19 has exceeded the predetermined maximum angle range. If the controller 202 determines that the "tilt" boost condition is not satisfied at (414), the controller 202 may, at (402), continue to monitor the implement position parameter relative to the ground surface 19.

If the controller 202 determines that the "tilt" boost condition is satisfied at (414), the controller 202 may initiate a "tilt" boost operation at (420). The "tilt" boost operation may be configured to quickly rotate the implement 32 relative to the ground surface 19 such that the implement position parameter no longer exceeds the predetermined implement parameter position threshold. For example, the "tilt" boost operation may include rotating the implement (e.g., as illustrated by arrows 112, 114 in FIG. 2) using at least one of the first tilt control cylinder 102 or the second tilt control cylinder 104 such that the implement angle is reduced to within the predetermined maximum angle range.

In some embodiments, the "tilt" boost operation may include computing a "tilt" boost output signal based on the boost time interval during which the boost condition is met. For example, computing the "tilt" boost signal may include calculating the integral of the implement angle with respect to time. In other embodiments, the controller 202 may be configured to compute the integral of the difference between the implement angle and the predetermined maximum angle range. For instance, in one embodiment, the boost output signal may be calculated according to the following equation in which θ (t) is the implement angle, $θ_1$ is a bound of the predetermined maximum angle range, and $K_L$ is a constant "lower" boost gain value.

$$S_{BOOST} = K_L \int (\theta(t) - \theta_1) dt \qquad (9)$$

In other embodiments, the controller 202 may be configured to compute a pair of "tilt" boost output signals configured to extend one of tilt control cylinder(s) 102, 104 and retract the other of tilt control cylinder(s) 102, 104. For example, computing a first "tilt" boost output signal may include computing an integral signal based on the difference between the local height 120 at the first end 106 of the implement 32 and an average of the local heights 120 at each end 106, 108. Similarly, computing a second "tilt" boost output signal may include computing an integral signal based on the difference between the local height 120 at the second end 108 of the implement 32 and an average of the local heights 120 at both ends 106, 108. The first and second components of the "tilt" boost output signal may be used to individually control the respective tilt cylinders 102, 104 to rotate the implement such that the implement angle is reduced to within the predetermined maximum angle range.

In some embodiments, the "tilt" boost operation may also include lowering the overall height of the implement 32 using the height control cylinder 101. For example, in some embodiments, the "tilt" boost operation may automatically trigger the "lower" boost operation explained above. As the implement 32 is rotated, the end of the implement 32 closest to the ground surface 19 may be raised by the rotating motion. Thus, to prevent the local height 120 of the lower end from being raised by the tilting motion and exceeding the predetermined height threshold, in some embodiments, the controller 102 may automatically lower the overall height of the implement 32 during the "tilt" boost operation.

In some embodiments, the controller 202 may be configured to apply a saturation function to one or more of the components of the normal output signal and/or the boost output signal. The saturation functions may be configured to prevent the respective signals from exceeding respective predetermined maximum values. This may prevent the controller 202 from causing damage and/or excessive wear to the harvester 10, header 32, feeder 34, the actuators 220, and/or the associated valves 218. Similarly, excessively fast changes in the total output signal may result in undesirably instability in the control system 200.

In some embodiments, the various boost operations discussed above (e.g., the "raise" boost, "lower" boost, and/or "tilt" boost") may not involve calculating an integral signal whatsoever. Instead, computing the boost signal may simply involve applying a ramp function, as described above, to a respective predetermined maximum boost output signal. For instance, once the boost condition is satisfied, the controller 202 may apply a ramp function to increase the boost output signal from zero to the maximum boost output signal over a first predetermined ramp time. Once the boost condition is no longer satisfied, the controller 202 may be configured to similarly ramp the boost output signal from the maximum boost output signal to zero over a second predetermined ramp time, which may be equal to or different than the first predetermined ramp time. The respective maximum boost output signals and ramp times associated with each boost operation may be selected to maximize the responsiveness of the control system 200 without damaging the actuators 220, without causing instability in the control system 200, and/or may be based on various system dynamics associated with the control system 200, as explained above. In some embodiments, the respective maximum boost output signals and ramp times may be input and/or modified by the operator using the user interface 222.

In other embodiments, the various boost operations may be based on a proportional signal, integral signal, and/or derivative signal associated with the implement position parameter. For example, in one embodiment, the boost output signal(s) may include respective separate PI or PID control loops which are "ramped" from zero to the calculated value when the boost condition is satisfied, in the manner described above. The parameters associated with the control loop of the boost output signal may be selected for a more rapid response than those of the PI or PID control loop that produces the normal output signal. The boost output signal(s) may then be "ramped" from the calculated value to zero when the respective boost condition is no longer satisfied.

In some embodiments, the control system 200 may also be configured to include an inactive mode in which the controller 202 does not actively control the position of the implement 32 relative to the ground surface 19. For example, during operation, the operator may make a pass across an agricultural work site, e.g., a field. After completing a pass, the operator may switch the controller 202 into the inactive mode and then initiate a manual lift of the implement 32, for example, using the user interface 222. In some embodiments, the controller 202 may automatically switch into the inactive mode once the operator manually lifts the implement 32 using the user interface 222. The operator may then turn the harvester 10 around to prepare for another pass across the agricultural work site.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for automatically controlling a position of an implement of an agricultural work vehicle relative to a ground surface, the method comprising:

monitoring, with one or more computing devices, an implement position parameter indicative of the position of the implement relative to the ground surface;

calculating, with one or more computing devices, a normal output signal associated with controlling an operation of an actuator based on the implement position parameter, the actuator being configured to adjust the position of the implement relative to the ground surface;

determining, with the one or more computing devices, when a boost condition is satisfied based on a comparison between the implement position parameter and a predetermined implement position parameter threshold;

when it is determined that the boost condition is satisfied, computing, with the one or more computing devices, a boost output signal associated with controlling the operation of the actuator based on the implement position parameter;

calculating, with the one or more computing devices, a total output signal for controlling the operation of the actuator as function of both the normal output signal and the boost output signal; and controlling, with the one or more computing devices, the operation of the actuator based on the total output signal to adjust the position of the implement relative to the ground surface.

2. The method of claim 1, wherein computing the boost output signal includes computing an integral signal based on the implement position parameter with respect to time.

3. The method of claim 1, wherein calculating the normal output signal includes calculating an integral signal based on the implement position parameter with respect to time.

4. The method of claim 1, wherein the actuator is configured to raise and lower the implement relative to the ground surface, the implement position parameter being indicative of an actuator pressure associated with the actuator.

5. The method of claim 4, wherein the boost condition is satisfied when the actuator pressure is less than a predetermined actuator pressure threshold.

6. The method of claim 1, wherein the boost condition is satisfied when the implement contacts the ground surface.

7. The method of claim 1, wherein the implement position parameter is indicative of an implement height relative to the ground surface.

8. The method of claim 7, wherein the boost condition is satisfied when the implement height exceeds a predetermined height maximum threshold relative to the ground surface.

9. The method of claim 7, wherein the boost condition is satisfied when the implement height is indicative of the implement contacting the ground surface.

10. The method of claim 1, wherein:
the implement position parameter is indicative of an implement angle relative to the ground surface;
the actuator is configured to adjust the implement angle relative to the ground surface;
the boost condition is satisfied when the implement angle exceeds a predetermined maximum angle range; and
controlling the operation of the actuator comprises controlling the operation of the actuator based on the total output signal such that the implement angle is reduced to within the predetermined maximum angle range.

11. The method of claim 1, further comprising applying a saturation function to the boost output signal.

12. The method of claim 1, wherein calculating the boost output signal includes applying a ramp function to the boost output signal in which the boost output signal increases from zero to a predetermined boost constant over a predetermined ramp time.

13. The method of claim 1, wherein calculating the total output signal for controlling the operation of the actuator as function of both the normal output signal and the boost output signal comprises summing the normal output signal and the boost output signal to calculate the total output signal.

14. A position control system for an implement of an agricultural work vehicle, the position control system comprising
an implement;
an implement position sensor configured to detect a position of the implement relative to a ground surface;
an actuator configured to adjust the position of the implement relative to the ground surface;
a controller communicatively coupled to the implement position sensor, the controller including a processor and associated memory, the memory storing instructions that, when executed by the processor, configure the implement controller to:
monitor an implement position parameter indicative of the position of the implement relative to the ground surface based on signals received from the implement position sensor;
calculate a normal output signal associated with controlling an operation of the actuator based on the implement position parameter;
determine when a boost condition is satisfied based on a comparison between the implement position parameter and a predetermined implement position parameter threshold;
when it is determined that the boost condition is satisfied, compute a boost output signal associated with controlling the operation of the actuator based on the implement position parameter;
calculate a total output signal for controlling the operation the actuator as function of both the normal output signal and the boost output signal; and
control the operation of the actuator based on the total output signal to adjust the position of the implement relative to the ground surface.

15. The system of claim 14, wherein the controller is further configured to compute an integral signal based on the implement position parameter with respect to time to compute the boost output signal.

16. The system of claim 14, wherein the controller is further configured to calculate an integral signal based on the implement position parameter with respect to time to calculate the normal output signal.

17. The system of claim 14, wherein the actuator is configured to raise and lower the implement relative to the ground surface, and wherein the implement position parameter is indicative of an actuator pressure associated with the actuator, and wherein the boost condition is satisfied when the actuator pressure is less than a predetermined actuator pressure threshold.

18. The system of claim 14, wherein the boost condition is satisfied when the implement contacts the ground surface.

19. The system of claim 14, wherein the implement position parameter is indicative of an implement height relative to the ground surface and the boost condition is satisfied when the implement height exceeds a predetermined height maximum threshold relative to the ground surface.

20. The system of claim 14, wherein:
the implement position parameter is indicative of an implement angle relative to the ground surface;
the actuator is configured to adjust the implement angle relative to the ground surface;
the boost condition is satisfied when the implement angle exceeds a predetermined maximum angle range; and
the operation of the actuator is controlled based on the total output signal such that the implement angle is reduced to within the predetermined maximum angle range.

21. The system of claim 14, wherein the controller is further configured to apply a ramp function to the boost output signal in which the boost output signal increases from zero to a predetermined boost constant over a predetermined ramp time.

22. The system of claim 14, wherein the controller is configured to calculate the total output signal by summing the normal output signal and the boost output signal.

\* \* \* \* \*